(12) United States Patent
Ciavarella et al.

(10) Patent No.: US 10,786,121 B2
(45) Date of Patent: Sep. 29, 2020

(54) FOAM PUMPS, REFILL UNITS AND DISPENSERS WITH DIFFERENTIAL BORE SUCK-BACK MECHANISM

(71) Applicant: GOJO Industries, Inc., Akron, OH (US)

(72) Inventors: Nick E. Ciavarella, Seven Hills, OH (US); Donald R. Harris, Mogadore, OH (US); Seth Andrew Glasgow, Stow, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 16/364,678

(22) Filed: Mar. 26, 2019

(65) Prior Publication Data

US 2019/0298115 A1 Oct. 3, 2019

Related U.S. Application Data

(60) Provisional application No. 62/649,069, filed on Mar. 28, 2018.

(51) Int. Cl.
*A47K 5/12* (2006.01)
*A47K 5/16* (2006.01)
(Continued)

(52) U.S. Cl.
CPC .......... *A47K 5/1211* (2013.01); *A47K 5/1207* (2013.01); *A47K 5/1208* (2013.01);
(Continued)

(58) Field of Classification Search
CPC .. A47K 5/1211; A47K 5/1207; A47K 5/1208; A47K 5/16; B05B 7/0062; G01F 11/08
(Continued)

(56) References Cited

U.S. PATENT DOCUMENTS

| 5,445,288 | A | * | 8/1995 | Banks | ................... B05B 7/0025 222/95 |
|---|---|---|---|---|---|
| 2011/0056990 | A1 | | 3/2011 | Proper et al. | |

(Continued)

OTHER PUBLICATIONS

International Search Report and Written Opinion of the International Searching Authority for International Appl. No. US2019/024022 dated Jun. 24, 2019, 14 pages.

*Primary Examiner* — Lien M Ngo
(74) *Attorney, Agent, or Firm* — Calfee, Halter & Griswold LLP

(57) ABSTRACT

An exemplary system for dispensing foam includes a container holding a foamable liquid, a pump, and a suck-back device. The suck back device has a housing having a small bore with first diameter and a large bore with a second diameter; a dual body piston with a first piston that reciprocates in the small bore and a second piston that reciprocates in the large bore; a flow restrictor located proximate the dual body piston, a suck back chamber formed at least in part by the large bore and the second piston, and a foam outlet. The flow restrictor is configured so that fluid flow into the suck back device causes the suck back chamber to compress and when the fluid flow stops, a biasing member causes the suck back chamber to expand and suck back residual foam into the suck back chamber.

20 Claims, 7 Drawing Sheets

(51) Int. Cl.
  *G01F 11/08*  (2006.01)
  *B05B 7/00*  (2006.01)
  *B05B 12/12*  (2006.01)
  *B05B 11/00*  (2006.01)

(52) U.S. Cl.
  CPC .............. *A47K 5/16* (2013.01); *B05B 7/0062* (2013.01); *B05B 12/122* (2013.01); *G01F 11/08* (2013.01); *B05B 11/3097* (2013.01)

(58) Field of Classification Search
  USPC ... 222/190, 375, 321.7, 321.9, 181.3, 185.1, 222/183
  See application file for complete search history.

(56) References Cited

U.S. PATENT DOCUMENTS

| | | | |
|---|---|---|---|
| 2012/0248149 A1 | 10/2012 | Pelfry | |
| 2012/0285992 A1* | 11/2012 | Ciavarella | F04C 13/00 222/138 |
| 2012/0315166 A1* | 12/2012 | Looi | F04B 9/045 417/413.1 |
| 2013/0299517 A1* | 11/2013 | Ciavarella | B05B 7/0037 222/190 |
| 2013/0341358 A1 | 12/2013 | Ciavarella et al. | |
| 2014/0054322 A1 | 2/2014 | McNulty et al. | |
| 2014/0054323 A1 | 2/2014 | McNulty et al. | |
| 2014/0061246 A1 | 3/2014 | McNulty et al. | |
| 2014/0124540 A1 | 5/2014 | Ciavarella et al. | |
| 2014/0205473 A1 | 7/2014 | Ciavarella et al. | |
| 2014/0261799 A1 | 9/2014 | Ciavarella et al. | |
| 2014/0263462 A1* | 9/2014 | Quinlan | B05B 11/3087 222/190 |
| 2015/0090737 A1* | 4/2015 | Ciavarella | A47K 5/1211 222/190 |
| 2015/0173568 A1* | 6/2015 | Harris | B05B 11/3087 222/190 |
| 2015/0297039 A1* | 10/2015 | Harris | B05B 7/0018 222/136 |
| 2015/0335208 A1 | 11/2015 | Ciavarella et al. | |

* cited by examiner

FOAM PUMPS, REFILL UNITS AND DISPENSERS WITH DIFFERENTIAL BORE SUCK-BACK MECHANISM

RELATED APPLICATIONS

This application claims priority to and the benefits of U.S. Provisional Application Ser. No. 62/649,069, titled FOAM PUMPS, REFILL UNITS AND DISPENSERS WITH DIFFERENTIAL BORE SUCK-BACK MECHANISM, which was filed on Mar. 28, 2018 and which is incorporated herein by reference in its entirety.

FIELD OF THE INVENTION

The various embodiments relate generally to pumps, refill units for foam dispensers, and dispenser systems, and more particularly to systems and dispensers having an improved method of preventing dripping when dispensing foam.

BACKGROUND INFORMATION

Liquid dispenser systems, such as, for example, liquid soap and sanitizer dispensers, provide a user with a predetermined amount of fluid upon actuation of the dispenser. In addition, it is sometimes desirable to dispense the fluid in the form of a foam by, for example, injecting air into a liquid to create a foamy mixture of liquid and air bubbles. Some liquids, such as, for example, alcohol-based liquids are difficult to foam and require enhanced mixing. Pumps for generating foam may form the foam by pumping a liquid and air mixture through a foam cartridge. After dispensing, residual foam tends to revert back to liquid and drip from the foam cartridge. It is desirable to have a foam pump that prevents residual liquid from dripping out of the pump after a user has received a dose of foam and removed her hands from beneath the pump outlet.

SUMMARY OF THE INVENTION

The present application discloses exemplary foam generating and dispensing pumps with an improved foam quality with less dripping after use as compared to existing foam cartridges. However, the inventive concepts are not limited to foam dispensing systems and may be applied to liquid pumps for dispensing soaps, sanitizers and lotions. In addition, the inventive concepts may be applied to food dispensing systems, glue dispensing systems and the like. These and other aspects of the exemplary embodiments will become apparent from the following detailed description, taken in conjunction with the accompanying drawings, illustrating by way of example the principles of the various exemplary embodiments.

Exemplary systems for providing anti-drip foam dispensers and systems are disclosed herein. An exemplary system for dispensing foam includes a container holding a foamable liquid, a pump for combining the foamable liquid with air to form a foam mixture, and a suck-back device. The suck back device has a housing. The housing has an upstream portion having a small bore with first diameter and a downstream portion having a large bore with a second diameter. The first diameter being smaller than the second diameter. The suck back mechanism includes a dual body piston having a first piston that reciprocates in the small bore and a second piston that reciprocates in the large bore. A biasing member for biasing the dual body piston in an upstream position is also included. In addition, a flow restrictor located proximate the dual body piston is included. A suck back chamber formed at least in part by the large bore and the second piston and a foam outlet that is located in the suck back chamber are also provided. The flow restrictor is configured so that fluid flowing into the suck back device causes the suck back chamber to compress and when the fluid flow stops, the biasing member causes the suck back chamber to expand and suck back residual foam into the suck back chamber.

An exemplary differential bore suck back device for a foam dispenser includes a housing having an upstream portion having a small bore with first diameter and a downstream portion having a large bore with a second diameter, wherein the first diameter is smaller than the second diameter. Also included is a dual body piston having a first piston that reciprocates in the small bore and a second piston that reciprocates in the large bore, a biasing member for biasing the dual body piston in an upstream position, a flow restrictor located proximate the dual body piston, a suck back chamber formed at least in part by the large bore and the second piston and a foam outlet. The flow restrictor is configured so that fluid flow into the suck back device causes the suck back chamber to compress and when the fluid flow stops, the biasing member causes the suck back chamber to expand and suck back residual foam into the suck back chamber.

Another exemplary differential bore suck-back device includes a housing having a first bore with a first diameter and a second bore with a second diameter wherein the first diameter is smaller than the second diameter, a first piston seal sized to contact a wall of the first bore and a second piston seal sized to contact a wall of the second bore. The first piston seal is connected to a body that includes a flow restrictor. The pistons are biased upward by a biasing member. A suck back chamber formed at least in part by the second bore and the second piston is also included. A foam outlet for allowing foam to flow out of the suck back chamber is also included. Movement of the second piston in a first direction causes the suck back chamber to compress and movement of the second piston in a second direction causes the suck back chamber to expand. Fluid flow through the flow restrictor causes movement of the first piston seal and the second piston seal in the first direction to cause the suck back chamber to compress and the biasing member causes the first piston seal and the second piston seal to move and expand the suck back chamber.

Another exemplary differential bore suck-back device includes a housing having a first bore with a first diameter and a second bore with a second diameter wherein the first diameter is smaller than the second diameter, a first piston seal sized to contact a wall of the first bore and a second piston seal sized to contact a wall of the second bore. The first piston seal is connected to a body that includes a flow restrictor. The pistons are biased upward by a biasing member. A suck back chamber formed at least in part by the second bore and the second piston is also included. A liquid outlet for allowing liquid to flow out of the suck back chamber is also included. Movement of the second piston in a first direction causes the suck back chamber to compress and movement of the second piston in a second direction causes the suck back chamber to expand. Liquid flow through the flow restrictor causes movement of the first piston seal and the second piston seal in the first direction to cause the suck back chamber to compress and the biasing member causes the first piston seal and the second piston seal to move and expand the suck back chamber.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

The novel differential bore suck back devices disclosed herein may be used in combination with many different pumps and/or dispensers, such as, for example, those shown and described in: U.S. Non-Provisional application Ser. No. 15/480,711 titled Sequentially Activated Multi-Diaphragm Foam Pumps, Refill Units and Dispenser Systems filed on Apr. 6, 2017; U.S. Pat. No. 8,960,498, titled Touch-Free Dispenser with Single Cell Operation and Battery Banking; U.S. Pat. No. 9,172,266, titled Power Systems For Touch Free Dispensers and Refill Units Containing a Power Source; U.S. Pat. No. 8,485,395 titled Dispenser Lockout Mechanism; U.S. Pat. App. No. 2015/0053720, titled Dispenser Having Top Loading and Unloading Refill Units; U.S. Pat. No. 8,091,738, titled Manual Skin-Care Product Dispenser; U.S. Pat. No. 8,272,539 filed on Dec. 3, 2008 and titled Angled Slot Foam Dispenser; U.S. Non-Provisional patent application Ser. No. 15/281,832, titled Slide Open Refillable Dispenser filed on Sep. 30, 2016. Each of which are incorporated herein by reference herein in its entirety.

Figure 1:
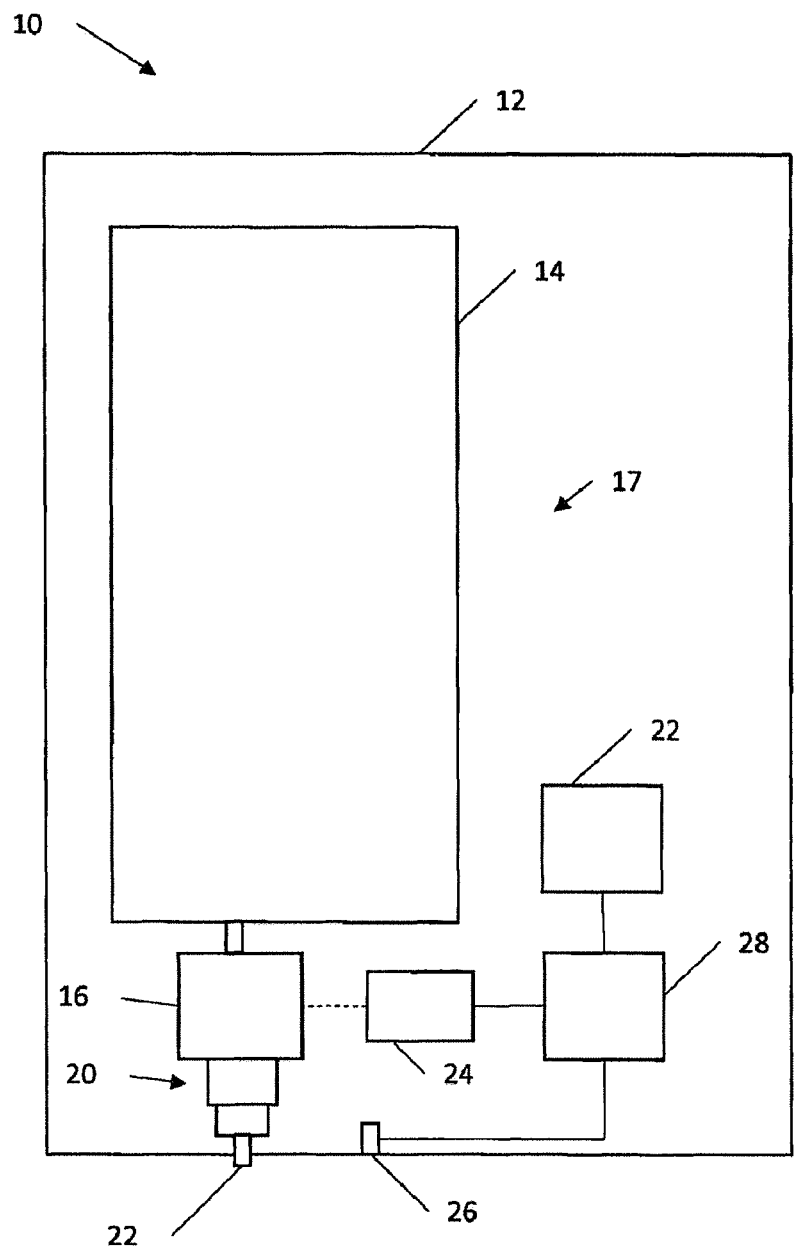
FIG. 1 is a schematic diagram of a system for dispensing foam in accordance with an exemplary embodiment.

FIG. 1 is a schematic diagram of an exemplary embodiment of a dispensing system 10. Dispensing system 10 includes a housing 12. Located within housing 12 is a container holding a liquid, such as, for example, a lotion, soap or sanitizer. In fluid communication with container 14 is a pump 16. In this exemplary embodiment, pump 16 is a foam pump that pumps both air and liquid, however, in some embodiments, the pumps are liquid pumps. In fluid communication with pump 16 is a differential bore suck-back device 20 and an outlet 22. In some embodiments, the container, pump and suck-back device 20 are collectively referred to as a refill unit 17. In such embodiments, the refill unit 17 may be removed from housing 12 when it is depleted or otherwise fails and replaced with a new refill unit filed with fluid. In some embodiments, container 14 may be removed without removing pump 16 from the dispenser housing 12. In some embodiments, the container 14 has a cap (not shown) and a valve (not shown) that allows the container 14 to be installed in the dispenser and removed therefrom in an inverted position without leaking.

Also, included in housing 12 is a processor 28, such as, for example, a microprocessor, a power source 22, such as, for example, a plurality of batteries, an actuator 24 for operating pump 26 and a sensor 26, such as, for example, an infrared sensor for sensing a user's hands. Power source 22, sensor 26 and controller 24 are in circuit communication with processor 28. In addition, additional circuitry may be included, such as, for example, the circuitry described in the references above that are incorporated herein.

In some embodiments, the dispenser is a manual dispenser. In such embodiments, the electronics, including the processor 28, the power source 22, and the sensor 26 may not be needed. A manual actuator is included to drive the pump 16. The suck-back device 20 may still operate as described herein.

Figure 2:
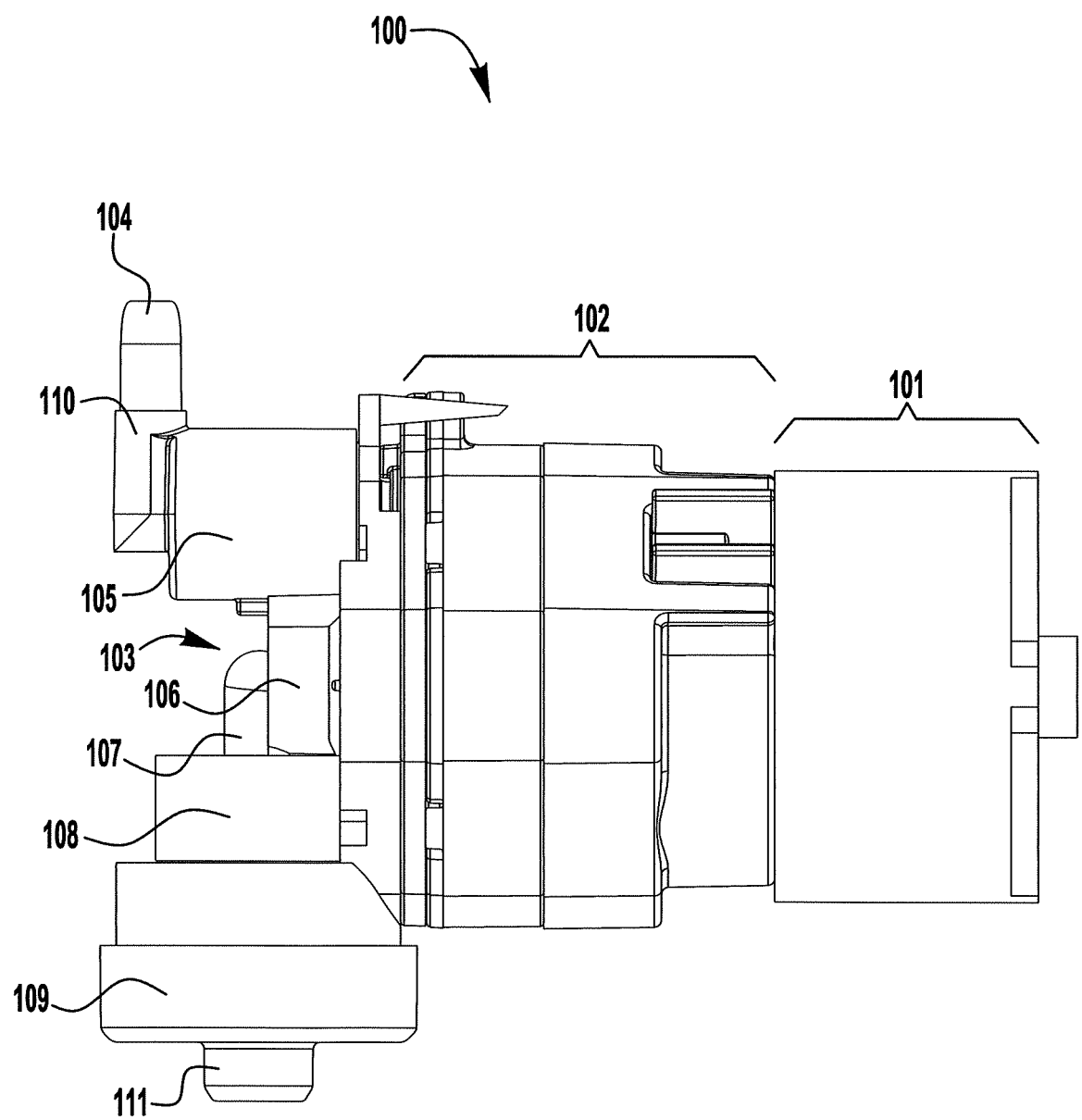
FIG. 2 is a side view of a portion of a system for dispensing foam in accordance with an exemplary embodiment.
Figure 2A:
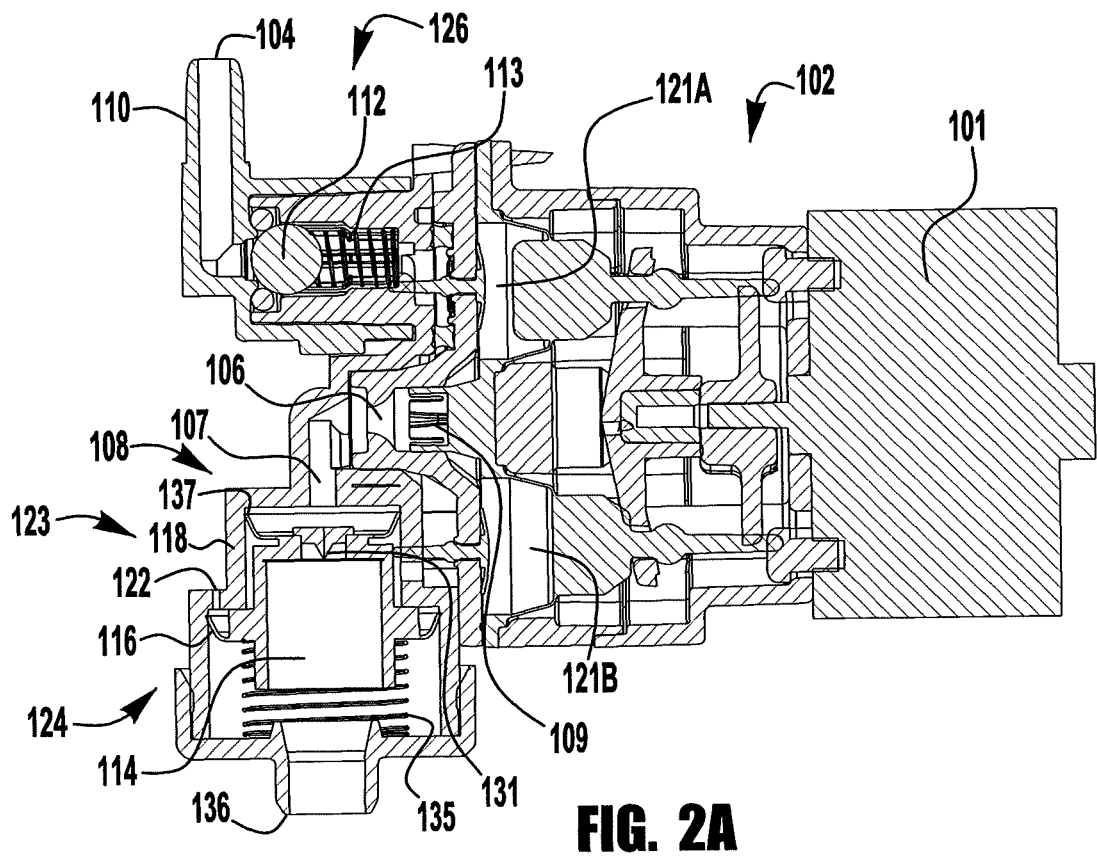
FIG. 2A is a cross-sectional view of a portion of a system for dispensing foam of FIG. 2 with a piston in the upward position.
Figure 2B:
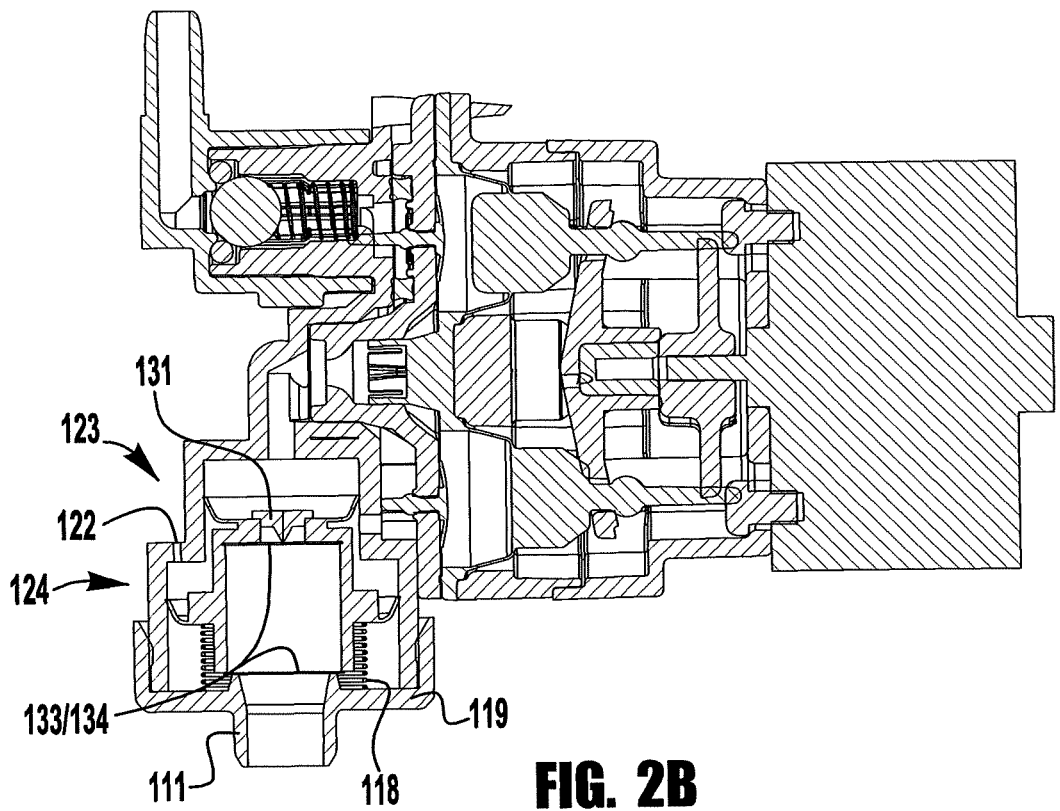
FIG. 2B is a cross-sectional view of a portion of a system for dispensing foam of FIG. 2 with a piston in the downward position.
Figure 4:
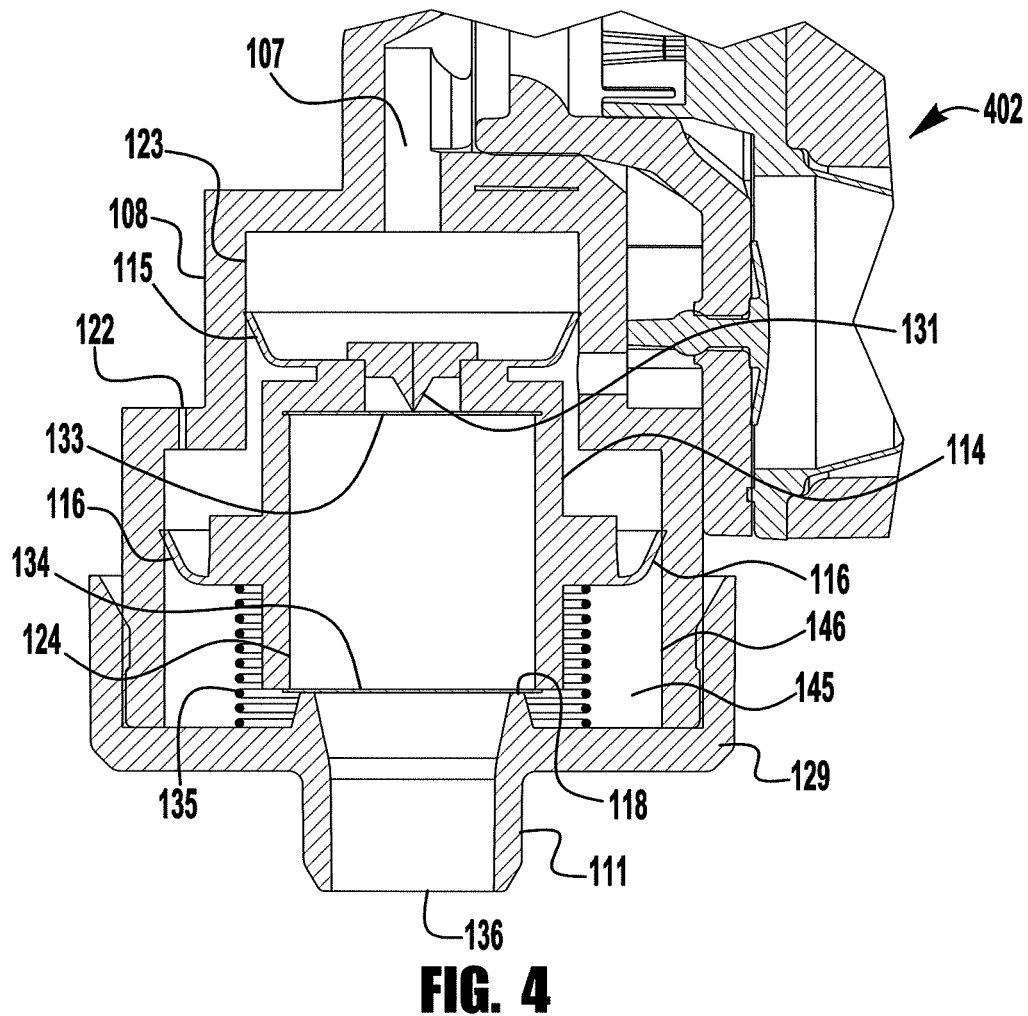
FIG. 4 is a cross-sectional view of a suck back device portion having a differential bore, a dual piston body, and foam outlet of FIG. 2.

Referring to FIG. 2, a side view of a portion of a system 100 for dispensing foam is illustrated. The system includes a motor 101, a pump portion 102, and a foam-generating assembly 103. In this exemplary embodiment, the portion of a system 100 for dispensing foam includes a liquid inlet 104 and an liquid inlet conduit 110, which connect to a reservoir or container (not shown) filled with a foamable liquid. This exemplary system 100 includes a chamber 105 for holding a one-way inlet valve 126, a mixing chamber 106, a fluid outlet conduit 107, a differential bore housing 108, a bottom tray 109, and a foam outlet 111. In exemplary embodiments, the motor and diaphragm may be replaced by other types of pumps and/or actuators, such as, for example, piston pumps, manual actuators, electronic actuators and the like, which are incorporated herein by reference. In an exemplary embodiment, the motor and pump diaphragm assembly may be, for example, those disclosed in U.S. application Ser. No. 15/350,190 filed on Nov. 14, 2016, entitled "Foaming Cartridge," and U.S. patent application Ser. No. 15/355,112, filed on Nov. 18, 2016, entitled "Sequentially Activated Multi-Diaphragm Foam Pumps, Refill Units and Dispenser Systems," all of which are hereby incorporated by reference in their entireties FIGS. 2A and 2B are a cross-sectional view of (the portion of) the system 100 with a suck back device 123. FIG. 4 is an enlarged cross-section al view of the suck-back device 123. The exemplary system 100 includes, a liquid inlet opening 104, a liquid inlet passageway 110, a one-way liquid inlet valve 126, which may be, for example a ball valve assembly as shown having a ball 112 and a spring 113. Other types of one-way inlet valves may be used in the disclosed embodiments. In some embodiments, one-way liquid inlet valve may be a mushroom valve, an umbrella valve, a flapper valve, a slit valve, a duck bill valve, a mush-ball valve, or the like. The exemplary system 100 includes pump portion 102 and a motor 101. Pump portion 102 includes four pumping diaphragms. Pumping diaphragms 121A, 121B are shown in this view. Pump diaphragm 121A is a liquid pump diaphragm. Pump diaphragm 121B and the two additional pump diaphragms (not shown) are air pump diaphragms.

Although this exemplary embodiment discloses four pump diaphragms, pumps having fewer or more pump diaphragms may be used. In some embodiments, one or more pump diaphragms are liquid pump diaphragms and in some embodiments, one or more diaphragms are air pump diaphragms. Exemplary details and components of the diaphragm assemblies are hereby incorporated by reference in their entirety from any of the applications incorporated herein including, for example, those in U.S. application Ser. Nos. 15/350,190 and 15/355,112. This exemplary system 100 further includes a one-way fluid outlet valve 109, a mixing chamber 106, a fluid passageway 107, and a differential bore housing 108.

Differential bore housing 108 includes aperture 122 that allows air into and out of the large bore 124 in differential bore housing 108. Differential bore housing 108 has a small bore 123 and a large bore 124. The aperture 122 allows air into and out of the upper portion of large bore 124 to prevent an air lock from inhibiting movement of dual piston body 114. Located within differential bore housing 108 is a dual piston body 114.

Dual piston body 114 has a small piston 115, a large piston 116, and a flow restrictor 131. Flow restrictor 131 may be a valve, a small orifice, baffles, screens, sponges or the like. The flow restrictor 131 is sized and configured so that pressure from the fluid air mixture causes the dual piston body 114 to travel downward. A biasing member 135, such as, for example, a spring, biases dual piston body 114 upward.

For example, flow restrictor 131 may be a valve having a cracking pressure that is greater than the force to move biasing member 135. Suitable valves may be a slit valve, a duck bill valve, a flapper valve, an umbrella valve, or the like. In some embodiments, an aperture that is sized to allow sufficient force as the fluid flows through to be generated by the liquid air mixture may be used as flow restrictor 131. In some embodiments, an aperture and the screens may be used as flow restrictor 131 to create sufficient pressure to move dual piston body 114. In some embodiments, an aperture and a foam member may be used as flow restrictor 131 in the foaming chamber to create sufficient force to move dual piston body 114. The system 100 for making foam also has a foam outlet passageway 111 located through bottom plate 109. Bottom plate 109 includes a lip 118 around foam outlet passageway 111 that extends above the surface 119 of bottom plate 109, and a foam outlet 136. As described in more detail below, lip 118 retains residual liquid inside the suck-back chamber 145.

During operation when a call is made for a dispense of foam, liquid is drawn in liquid inlet 104, through inlet conduit 110, past one-way inlet valve 126, into liquid pump diaphragm 121A, past fluid outlet valve 105 and into mixing chamber 106. Air flows in through one or more air inlets (not shown) into air pump diaphragm 121B (and in this exemplary embodiment two additional air pump diaphragms that are not shown). Air flows out of the air pump diaphragms through fluid outlet valve 105 and into mixing chamber 106 where the liquid air mix to form a liquid/air mixture. The liquid/air mixture flows through flow restrictor 131 thereby moving dual piston body 114 downward, through dual piston body 114, past first mix media 133 into first foaming stage area 128 and through second mix media 134 and out of opening 136 in outlet nozzle 111. First mix media 133 and second mix media 134 are screens in this exemplary embodiment, however, the mix media may be for example, a plurality of baffles, one or more porous members, one or more sponges, and the like.

As the liquid/air mixture flows through flow restrictor 131, dual piston body 114, which includes small piston 115 and large piston 116 are forced downward compressing biasing member 135 and compressing the volume of suck-back chamber 145. As the volume of suck-back chamber 145 is compressed, residual foam and liquid in suck-back chamber 145 is forced out and dispensed through outlet nozzle 111.

When the foam flow stops, biasing member 135 urges dual piston body 114, small piston 115 and large piston 116 upward expanding suck-back chamber 145. Upward movement of small piston 115 forces some of the liquid/air mixture in upper chamber to flow through restrictor 131 and through mix media 133, 134. Residual foam in outlet nozzle 111 and in first foaming stage 128 is sucked into suck-back chamber 145.

Lip 118 extends above bottom surface 148 of suck-back chamber 145. Accordingly, as the residual foam that enters the suck-back chamber 145, breaks down and becomes liquid, the liquid is retained in the suck-back chamber 145 by lip 118 until dual piston body 114 is moved downward again expelling the residual foam/liquid out of the suck-back chamber 145.

Figure 3:
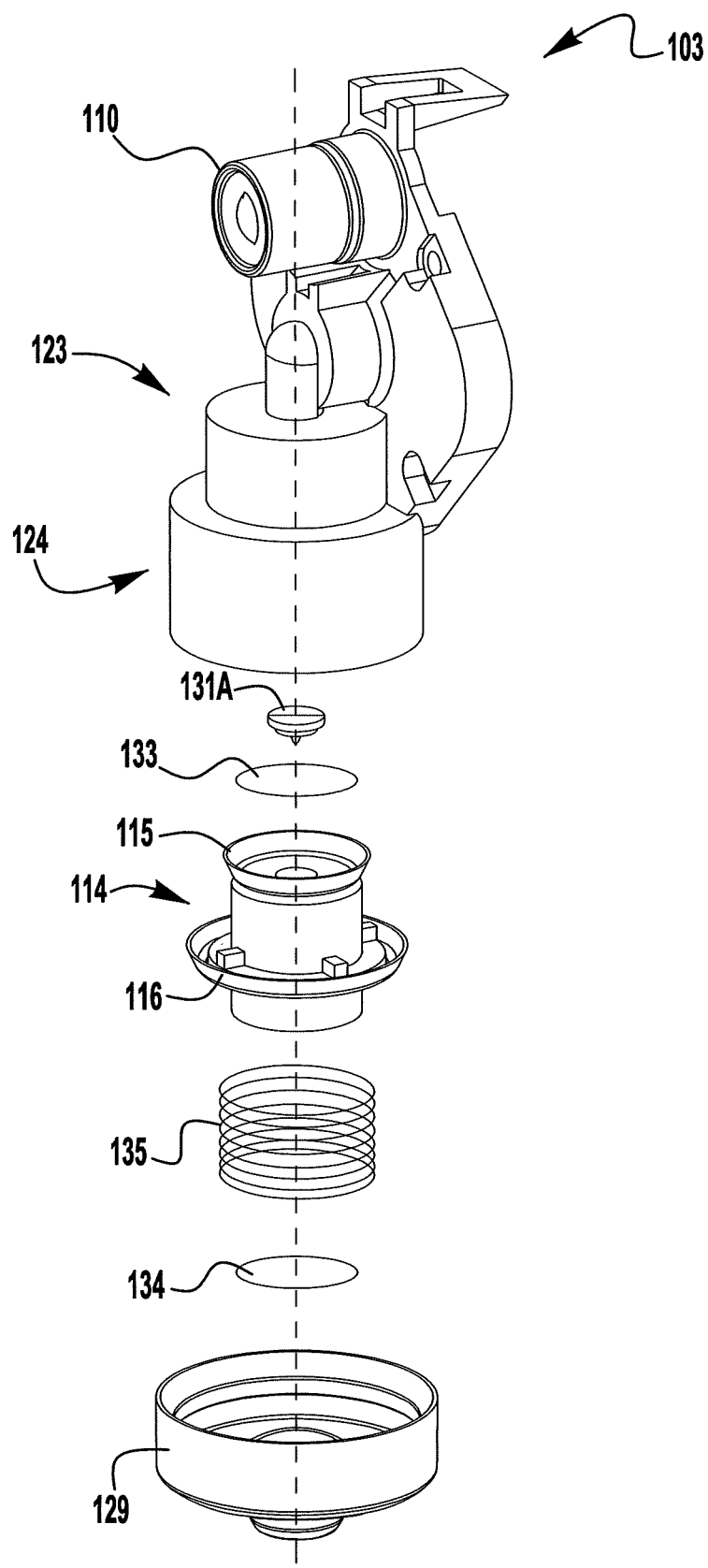
FIG. 3 is an exploded view of a portion of the system of FIG. 2.

FIG. 3 illustrates an exploded view of the components of the foam making assembly 103 described above. In this exemplary embodiment, flow restrictor 131 is illustrated as a slit valve.

FIG. 4 is an enlarged illustration of the housing 108 that includes differential bore 402. Differential bore 402 includes a first portion that has a first diameter and a second portion that has a second diameter. The second diameter is larger than the first diameter. Located within differential bore 402 is dual piston body 114 and foam cartridge 128. Bottom tray 129 is connected to housing 108 and includes outlet nozzle 111, liquid retaining member 118 and foam outlet 136.

Figure 5:
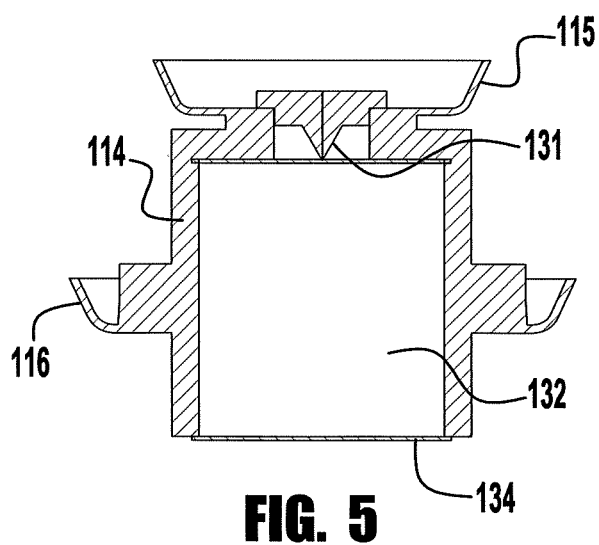
FIG. 5 is a cross-sectional view of the dual piston body and foam cartridge of FIG. 2.
Figure 6:
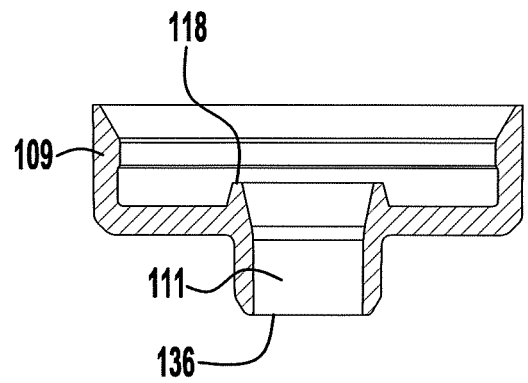
FIG. 6 is a view of a prospective view of the bottom plate of FIG. 2.

FIG. 5 is an enlarged view of the dual piston body 114 and FIG. 6 is an enlarged view of bottom tray 109.

Figure 7:
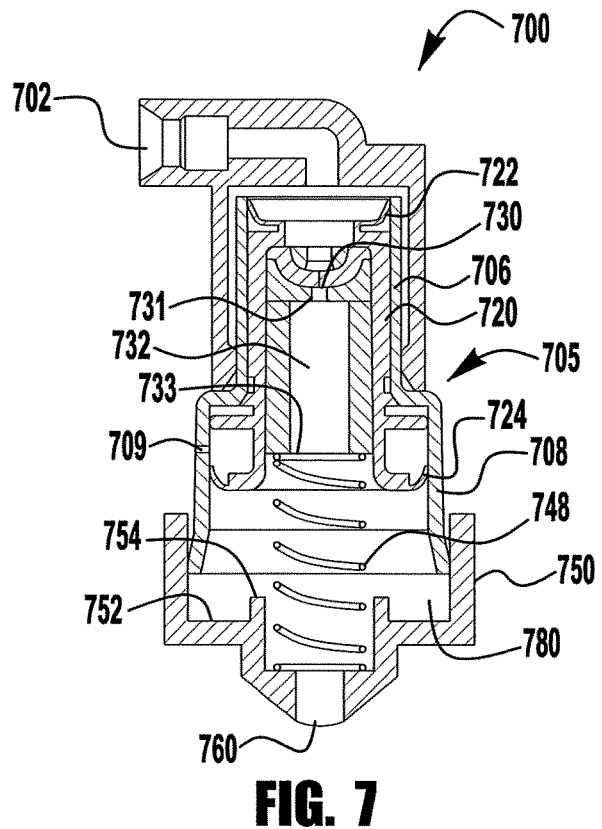
FIG. 7 is a cross-sectional view of another exemplary embodiment of a suck-back device portion having a differential bore, a dual piston body and a foam outlet.

FIG. 7 is a cross-sectional view of another exemplary embodiment of a suck-back device 700 having a differential bore 705, a dual piston body 720 and a foam outlet 760. Dual piston body 720 has a first smaller piston 722 that reciprocates within small bore 706 of dual bore 705 and a large piston 724 that reciprocates within large bore 708. Suckback device 700 has an inlet 702 for receiving a liquid air foam mixture.

In some embodiments, differential bore housing 705 includes aperture 708 that allows air into and out of the large bore 709 in differential bore housing 705. The aperture 709 allows air into and out of the upper portion of large bore 708 to prevent an air lock from inhibiting movement of dual piston body 720.

In addition, dual piston body 720 includes a flow restrictor 730. Flow restrictor 730 may be a valve, a small orifice, baffles, screens, sponges or the like. The flow restrictor 730 is sized and configured so that pressure from the fluid air mixture causes the dual piston body 720 to travel downward. A biasing member 748, such as, for example, a spring, biases dual piston body 720 upward.

Flow restrictor 730 may be a valve having a cracking pressure that is greater than the force to move biasing member 1748. Suitable valves may be a slit valve, a duck bill valve, a flapper valve, an umbrella valve, or the like. In some embodiments, flow restrictor 730 is an aperture that is sized to allow sufficient force to be generated by the liquid air mixture may be used as flow restrictor 730. In some embodiments, an aperture and one or more screens may be used as flow restrictor 730 to create sufficient pressure to move dual piston body 720. In some embodiments, an aperture and a porous member may be used as flow restrictor 730 in the foaming chamber to create sufficient force to move dual piston body 720. The suck back device 700 also has a foam outlet passageway 760 located through bottom plate 750. Bottom plate 750 includes a bottom surface 752 and lip 754 around foam outlet 760 that extends above the bottom surface 752 of bottom plate 750 and foam outlet 760. As described in more detail below, lip 754 retains residual liquid inside the suck-back chamber 780.

During operation when a call is made for a dispense of foam, a liquid/air mixture flows through inlet 702, through flow restrictor 730 thereby moving dual piston body 720 downward, through the interior of dual piston body 720, past first mix media 731 into first foaming stage area 732 and through second mix media 733 and out of foam outlet 760. First mix media 731 and second mix media 732 are screens in this exemplary embodiment, however, one or more of the mix media may be for example, a plurality of baffles, one or more porous members, one or more sponges, and the like. In some embodiments, no mix media is required.

As the liquid/air mixture flows through flow restrictor 730, dual piston body 720, which includes small piston 722 and large piston 724 are forced downward compressing biasing member 748 and compressing the volume of suck-back chamber 780. As the volume of suck-back chamber 780 is compressed, residual foam and liquid in suck-back chamber 780 is blown out and dispensed through outlet nozzle 760.

When the foam output stops, biasing member 748 urges dual piston body 750 including small piston 722 and large piston 724 upward expanding suck-back chamber 780. Upward movement of small piston 722 forces liquid/air mixture in upper chamber to flow through restrictor and through mix media 731, 733. Residual foam in outlet 760 and in first foaming stage 732 is sucked into suck-back chamber 780.

Lip 754 extends above bottom surface 752 of suck-back chamber 780. Accordingly, as the residual foam that enters the suck-back chamber 780 breaks down and becomes liquid, the liquid is retained in the suck-back chamber 780 by lip 754 until dual piston body 720 is moved downward again expelling the residual foam/liquid out of the suck-back chamber 780.

Figure 8:
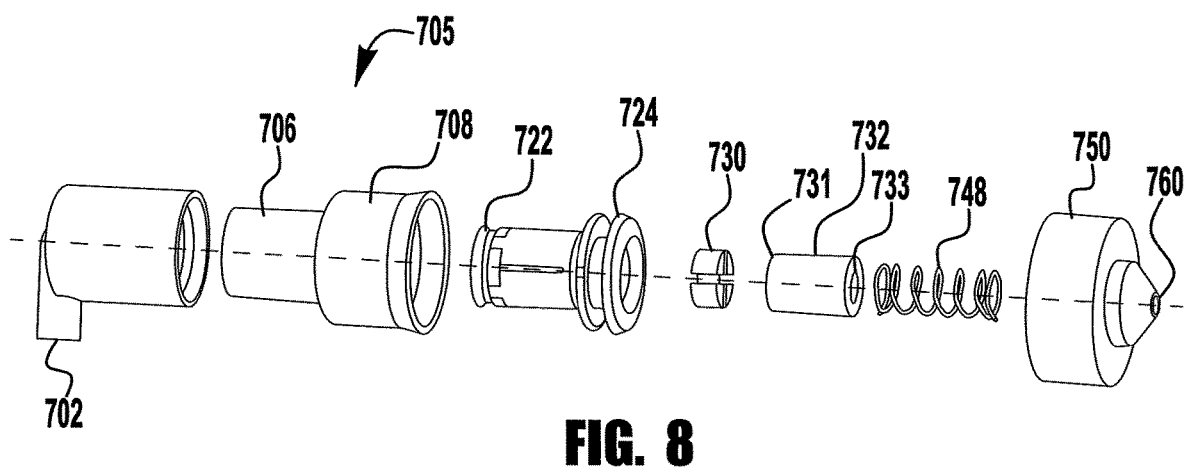
FIG. 8 is an exploded prospective view of the suck-back device of FIG. 7.

FIG. 8 is an exploded prospective view of the suck-back device of FIG. 7.

Figure 9:
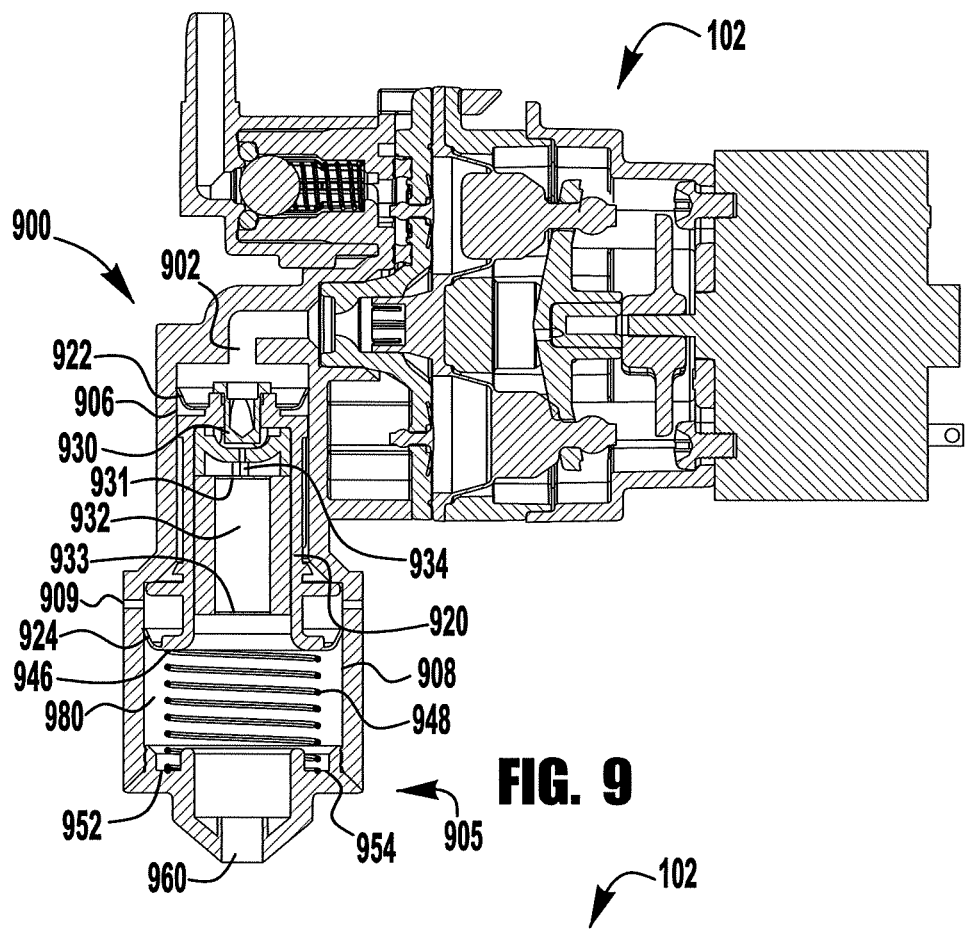
FIG. 9 is a cross-sectional view of another exemplary embodiment of a suck-back device portion having a differential bore, a dual piston body and a foam outlet.

FIG. 9 is a cross-sectional view of another exemplary embodiment of a suck-back device 900 having a differential bore 905, a dual piston body 920 and a foam outlet 960. Suck-back device 900 is connected to the outlet of a pump 102. Pump 102 is a sequentially activated diaphragm foam pump, but may be any type of pump, such as those described and/or incorporated herein by reference. Dual piston body 920 has a first smaller piston 922 that reciprocates within small bore 906 of dual bore 905 and a large piston 924 that reciprocates within large bore 908. Suck-back device 900 has an inlet 902 for receiving a liquid air foam mixture.

In some embodiments, differential bore housing 905 includes aperture 909 that allows air into and out of the large bore 908 in differential bore housing 905. The aperture 908 allows air into and out of the upper portion of large bore 908 to prevent an air lock from inhibiting movement of dual piston body 920.

In addition, dual piston body 920 includes a flow restrictor 930. In this exemplary embodiment, flow restrictor 930 is a duck-bill valve. Other types of valves may be used. In some embodiments, the flow restrictor may be a valve, a small orifice, baffles, screens, sponges or the like. The flow restrictor 930 is sized and configured so that pressure from the fluid air mixture causes the dual piston body 920 to travel downward. A biasing member 948, such as, for example, a spring, biases dual piston body 920 upward. Preferably, flow restrictor 930 has a cracking pressure that is greater than the force to move biasing member 948. Other suitable valves may be a slit valve, a flapper valve, an umbrella valve, or the like.

The suck-back device 900 also has a foam outlet passageway 960 located through bottom plate 950. Bottom plate 950 includes a bottom surface 952 and lip 954 around foam outlet 960 that extends above the bottom surface 952 of bottom plate 950 and foam outlet 960. As described in more detail below, lip 954 retains residual liquid inside the suck-back chamber 980. In addition, biasing member 948 is located in large bore 908 and rests on floor 952. An annular groove 946 in dual piston body 920 retains the upper end of biasing member 948.

During operation when a call is made for a dispense of foam, a liquid/air mixture flows through inlet 902, through flow restrictor 930 thereby moving dual piston body 920 downward, through the interior of dual piston body 920, past first mix media 931 into first foaming stage area 932 and through second mix media 933 and out of foam outlet 960. First mix media 931 and second mix media 932 are screens in this exemplary embodiment, however, the mix media may be for example, a plurality of baffles, one or more porous members, one or more sponges, and the like. In some embodiments, no mix media is required.

As the liquid/air mixture flows through flow restrictor 930, dual piston body 920, which includes small piston 922 and large piston 924 are forced downward compressing biasing member 948 and compressing the volume of suck-back chamber 980. As the volume of suck-back chamber 980 is compressed, residual foam and liquid in suck-back chamber 980 is blown out and dispensed through outlet nozzle 960.

When the fluid mixture stops flowing into suck back device 900, biasing member 948 urges dual piston body 950, including small piston 922 and large piston 924, upward expanding suck-back chamber 980. Upward movement of small piston 922 forces liquid/air mixture in upper chamber to flow through restrictor and through mix media 931, 933. Residual foam in outlet 960 and in first foaming stage 932 is sucked into suck-back chamber 980.

Lip 954 extends above bottom surface 952 of suck-back chamber 980. In some embodiments of the suck-back devices disclosed herein, a lip is not needed. For example, in this exemplary embodiment, the bottom surface 952, or a portion thereof, may slope away from the outlet 960 to retain fluid in the suck-back device 900. Accordingly, as the residual foam that enters the suck-back chamber 980 breaks down and becomes liquid, the liquid is retained in the suck-back chamber 980 by lip 954 (or other means, such as, for example, a sloped floor) until dual piston body 920 is moved downward again expelling the residual foam/liquid out of the suck-back chamber 980.

Figure 10:
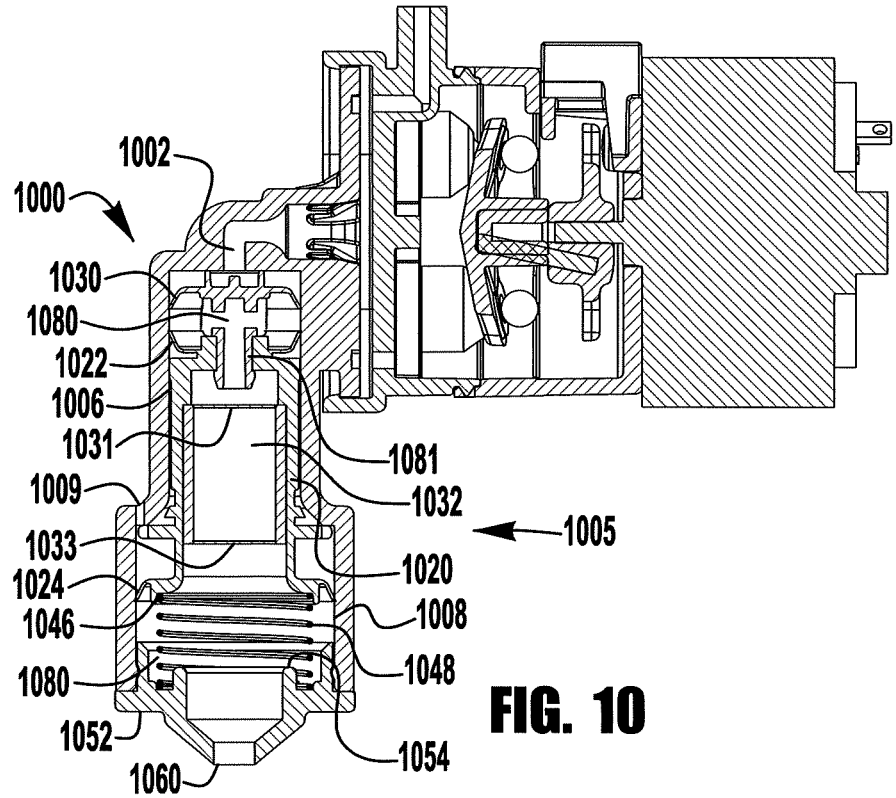
FIG. 10 is a cross-sectional view of another exemplary embodiment of a suck-back device portion having a differential bore, a dual piston body and a foam outlet.

FIG. 10 is a cross-sectional view of another exemplary embodiment of a suck-back device 1000 having a differential bore 1005, a dual piston body 1020 and a foam outlet 1060. Suck-back device 1000 is connected to the outlet of a pump 102. Pump 102 is a sequentially activated diaphragm foam pump, but may be any type of pump, such as those described and/or incorporated herein by reference. Suck-back device 1000 has an inlet 1002 for receiving a liquid air foam mixture. Dual piston body 1020 has a first smaller piston 1022 that reciprocates within small bore 1006 of dual bore 1005 and a large piston 1024 that reciprocates within large bore 1008.

In some embodiments, differential bore housing 1005 includes aperture 1009 that allows air into and out of the large bore 1008 in differential bore housing 1005. The aperture 1008 allows air into and out of the upper portion of large bore 1008 to prevent an air lock from inhibiting movement of dual piston body 1020.

In addition, dual piston body 1020 includes a flow restrictor 1030. In this exemplary embodiment, flow restrictor 1030 is a wiper seal 1023 that travels along the small bore 1006 and faces the opposite direction as smaller piston 1022. In addition, dual piston body 1020 includes a passageway 1080, 1081 through the dual piston body 1020 into the interior of the dual piston body 1020.

In some embodiments, flow restrictor 1030 is formed, at least in part, by top surface 1090 of the piston body and bottom surface 1091 of the housing surrounding the inlet 1002. In some embodiments, surface 1090 forms a seal with surface 1091 when biasing member 1048 biases dual piston body 1020 in its uppermost position.

A biasing member 1048, such as, for example, a spring, biases dual piston body 1020 upward. Preferably, flow restrictor 1030 has a cracking pressure that is greater than the force to move biasing member 1048.

The suck-back device 1000 also has a foam outlet passageway 1060 located through bottom plate 1050. Bottom plate 1050 includes a bottom surface 1052 and optional lip 1054 around foam outlet 1060 that extends above the bottom surface 1052 of bottom plate 1050 and foam outlet 1060. As described in more detail below, lip 1054 retains residual liquid inside the suck-back chamber 1080. In addition, biasing member 1048 is located in large bore 1008 and rests on floor 1052. An annular groove 1046 in dual piston body 1020 retains the upper end of biasing member 1048.

During operation when a call is made for a dispense of foam, a liquid/air mixture flows through inlet 1002, around flow restrictor 1030 thereby moving dual piston body 1020 downward, through passages 1080, 1081 into the interior of dual piston body 1020, past first mix media 1031 into first foaming stage area 1032 and through second mix media 1033 and out of foam outlet 1060. First mix media 1031 and second mix media 1032 are screens in this exemplary embodiment, however, the mix media may be for example, a plurality of baffles, one or more porous members, one or more sponges, and the like. In some embodiments, no mix media is required.

As the liquid/air mixture flows around flow restrictor 1030, dual piston body 1020, which includes small piston 1022 and large piston 1024 are forced downward compressing biasing member 1048 and compressing the volume of suck-back chamber 1080. As the volume of suck-back chamber 1080 is compressed, residual foam and liquid in suck-back chamber 1080 is blown out and dispensed through outlet nozzle 1060.

When the fluid mixture stops flowing into suck back device 1000, biasing member 1048 urges dual piston body 1050, including small piston 1022 and large piston 1024, upward expanding suck-back chamber 1080. Upward movement of small piston 1022 forces liquid/air mixture in upper chamber to flow through restrictor and through mix media 1031, 1033. Residual foam in outlet 1060 and in first foaming stage 1032 is sucked into suck-back chamber 1080.

Lip 1054 extends above bottom surface 1052 of suck-back chamber 1080. In some embodiments of the suck-back devices disclosed herein, a lip is not needed. For example, in this exemplary embodiment, the bottom surface 1052, or a portion thereof, may slope away from the outlet 1060 to retain fluid in the suck-back device 1000. Accordingly, as the residual foam that enters the suck-back chamber 1080 breaks down and becomes liquid, the liquid is retained in the suck-back chamber 1080 by lip 1054 (or other means, such as, for example, a sloped floor) until dual piston body 1020 is moved downward again expelling the residual foam/liquid out of the suck-back chamber 1080.

The inventive concepts disclosed herein are not to be limited in scope by the specific embodiments described herein. Further, although some of the embodiments have been described herein in the context of a particular implementation in a particular environment for a particular purpose, those of ordinary skill in the art should recognize that its usefulness is not limited thereto and that the various embodiments can be beneficially implemented in any number of environments for any number of purposes. Accordingly, the claims set forth below should be construed in view of the full breadth and spirit of the embodiments as disclosed herein. While the foregoing description includes many details and specificities, it is to be understood that these have been included for purposes of explanation only, and are not to be interpreted as limitations of the various embodiments. Many modifications to the embodiments described above can be made without departing from the spirit and scope of this description.

The invention claimed is:

1. A system for dispensing foam comprising:
   a container holding a foamable liquid;
   a pump for combining the foamable liquid with air to form a foam mixture; and
   a suck-back device;
   the suck back device having a housing;
      the housing having an up stream portion having a small bore with first diameter and a downstream portion having a large bore with a second diameter;
      the first diameter being smaller than the second diameter;
      a dual body piston having a first piston that reciprocates in the small bore and a second piston that reciprocates in the large bore;
      a biasing member biasing the dual body piston in an upstream position;
      a flow restrictor located downstream of a liquid outlet valve;
      a suck back chamber formed at least in part by the large bore and the second piston; and
      a foam outlet;
   wherein the flow restrictor is configured so that fluid flow through the flow restrictor causes the suck back chamber to compress in the direction of the fluid flow and when the fluid flow stops, the biasing member causes the suck back chamber to expand and suck back residual foam into the suck back chamber.

2. The system of claim 1, wherein the suck back chamber has a floor and the floor has a lip projecting upward therefrom and the lip encircles the foam outlet.

3. The system of claim 1, further comprising mix media located within the dual body piston.

4. The system of claim 1, further comprising an aperture located in the housing proximate the large bore for allowing air to flow in and out of the housing when the large piston moves.

5. The system of claim 1, wherein the pump is a sequentially activated diaphragm pump.

6. The system of claim 1, wherein the flow restrictor comprises an aperture.

7. The system of claim 1, wherein the flow restrictor comprises valve.

8. A differential bore suck-back device comprising:
a housing having a first bore having a first diameter and a second bore having a second diameter;
wherein the first diameter is smaller than the second diameter;
a first piston seal sized to contact a wall of the first bore and a second piston seal sized to contact a wall of the second bore;
wherein the first piston seal is connected to a body that includes a flow restrictor;
wherein pistons are biased upward by a biasing member;
a suck back chamber formed at least in part by the second bore and the second piston seal; and
a foam outlet for allowing foam to flow out of the suck back chamber;
wherein fluid flow through the flow restrictor causes movement of the first piston seal and the second piston seal in a first direction that is in the same direction as the fluid flow and which causes the suck back chamber to compress;
wherein the biasing member cases the first piston seal and the second piston seal to move in a second direction and expand the suck back chamber.

9. The system of claim 8, wherein the suck back chamber has a floor and the floor has a lip projecting upward therefrom and the lip encircles the foam outlet.

10. The system of claim 8, further comprising mix media located within the dual body piston.

11. The system of claim 8, wherein the pump is a sequentially activated diaphragm pump.

12. The system of claim 8, wherein the pump is a piston pump.

13. The system of claim 8, wherein the dual body piston is hollow.

14. The system of claim 8, wherein the flow restrictor comprises an aperture.

15. The system of claim 8, wherein the flow restrictor comprises valve.

16. A differential bore suck-back device comprising:
a housing having a first bore having a first diameter and a second bore having a second diameter;
wherein the first diameter is smaller than the second diameter;
a first piston seal sized to contact a wall of the first bore and a second piston seal sized to contact a wall of the second bore;
wherein the first piston seal is connected to a body that includes a flow restrictor;
wherein pistons are biased upward by a biasing member;
a suck back chamber formed at least in part by the second bore and the second piston;
an outlet located in the housing proximate the second bore;
a liquid outlet for allowing liquid to flow out of the suck back chamber;
wherein liquid flow through the flow restrictor causes movement of the first piston seal and the second piston seal in the direction of the fluid flow and causes the suck back chamber to compress;
wherein the biasing member cases the first piston seal and the second piston seal to move in a second direction and expand the suck back chamber when the fluid flow stops.

17. The system of claim 16, wherein the suck back chamber has a floor and the floor has a lip projecting upward therefrom and the lip encircles the liquid outlet.

18. The system of claim 16, wherein the dual body piston is hollow.

19. The system of claim 16, wherein the flow restrictor comprises an aperture.

20. The system of claim 16, wherein the flow restrictor comprises valve.

* * * * *